Feb. 19, 1924.                  1,484,583
M. TATEOKA
BROODER HEATING DEVICE
Filed Oct. 29, 1921
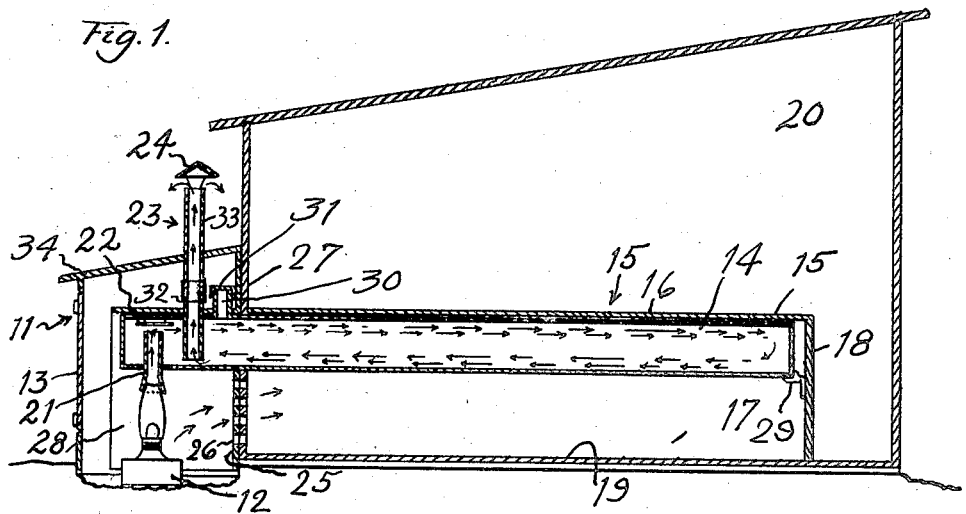
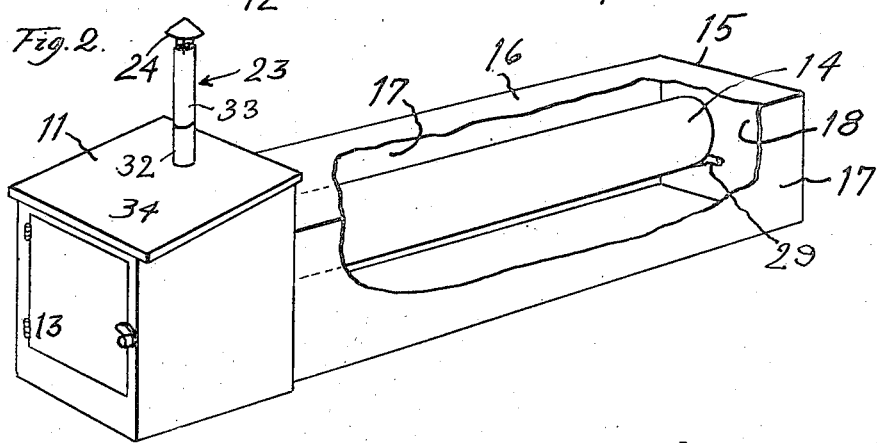
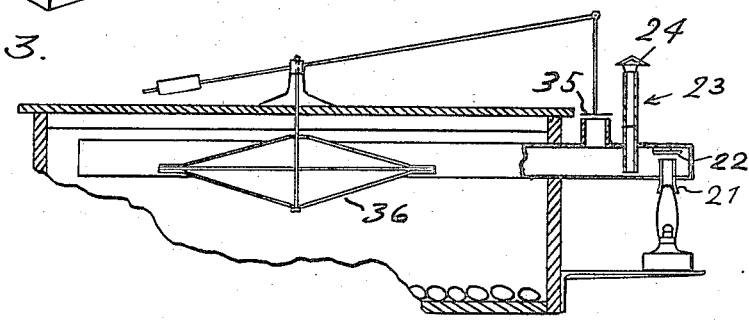
INVENTOR:
    Mitsuji Tateoka.
By Atty:
    Edward M. Kojima Patented Feb. 19, 1924.

1,484,583

UNITED STATES PATENT OFFICE.

MITSUJI TATEOKA, OF GARDENA, CALIFORNIA.

BROODER-HEATING DEVICE.

Application filed October 29, 1921. Serial No. 511,279.

*To all whom it may concern:*

Be it known that I, MITSUJI TATEOKA, a subject of the Emperor of Japan, residing at Gardena, in the county of Los Angeles and State of California, have invented a new and useful Brooder-Heating Device, of which the following is a specification.

My invention relates to an improved heating apparatus for brooders and incubators, the purposes of the invention being to provide a device of this character which may be readily applied to any brooder, to provide a heating device in which an ordinary lamp may be utilized for generating the heat, to provide a heating device which is inexpensive to construct, and to provide a heating device capable of more uniform distribution of the heat and more efficiency in use than heretofore used in brooders and incubators, and to provide a heating device which may be readily attached to and detached from the brooder or incubator for convenience in cleaning, or to facilitate packing for transportation.

With these objects in view, my invention consists in certain novel features of construction and combination of parts which will be hereinafter described and pointed out in the claims.

In the drawings, Figure 1 is a longitudinal and sectional view of a brooder having my improved heating device applied thereto. Fig. 2 is a perspective view of the heating device. Fig. 3 is a fragmentary view of an incubator having my heating device applied thereto.

Referring to the drawings, my improved heater consists of a housing 11, open at the bottom, and enclosing a lamp 12. The housing is provided with a door 13, which may be opened to provide the degree of draft desired for the lamp. In the upper portion of the housing, I provide a relatively large cylindrical casing 14, adapted to extend approximately the full length of the brooder hood 15, which in this case, consists of a top 16, sides 17, and end 18, the floor 19, of the brooder house 20, comprising the floor of the brooder hood. This casing 14, is closed at each end, and, adjacent to the end projecting within the housing, I provide a transversely disposed tube 21, extending vertically to approximately the top portion of casing 14, and serving as a flue for conveying the heated air and gases from lamp 12, to the top part of the casing. A deflector 22, is mounted above the tube 21. The heated air, after circulating within the tube 14, escapes through tube 23, which serves as a vent for the heating device. Vent tube 23 is adjacent to tube 21, and extends nearly to the bottom of the tube 14, being provided with a deflector 24 at the top. The inner housing wall 25 is provided with apertures 26, for circulating the heated air from the housing chamber to the brooder; the wall 27, of the brooder house being provided with corresponding apertures. An air deflector 28 extends from the tube 14, downwardly, on each side of the lamp, so that only the air which passes close to the lamp will pass through the apertures in the housing and into the brooder. A bracket 29, supports the tube 14 within the brooder. The tubing 14 is provided with a draft vent 30, normally closed by a cap 31 when the heater is applied to a brooder. Vent tube 23 consists of two telescoping sections 32 and 33, the section 33, being detachable, and extending through the roof 34 of housing 11. Vent 30 may be omitted when the heater is applied to a brooder.

When applied to an incubator, as shown in Fig. 3, the draft vent 30 is automatically opened and closed by the disk 35, which is operated by the expansion and contraction of the metal regulator 36, within the incubator.

In use, the heated air, generated by the lamp, passes through flue 21, to the top of the relatively horizontal tube 14. The heated air then passes along the upper part of the tube and returns along the bottom thereof, finally escaping through vent tube 23. The air heated within the housing, and not containing any of the gases of combustion, passes through the apertures in the housing and wall of the brooder house.

The all-metal thermostat shown in the brooder, is at present in use, and I do not claim this as my invention, except in combination with my improved heater.

From the foregoing it may be seen that I have provided a simple and efficient device for heating and regulating the temperature of brooders and incubators; my device embodying means for utilizing the heat from ordinary lamps, and for maintaining a suitable "running" temperature therefor, and for extracting the heat from the gases of combustion, and yet maintaining the combustion gases separate from the circulating air of the brooder or incubator.

What is claimed is:

1. In a brooder-heater, the combination with a housing, of a lamp therein, a horizontal cylindrical member extending from the housing and within the brooder, said cylindrical member being closed at each end, a flue disposed vertically in one end of the cylindrical member and extending approximately to the top portion of the cylindrical member and serving to conduct the combustion gases from the lamp within the cylindrical member, a deflector above the flue, a vent tube extending vertically from the cylindrical member and adjacent to the flue and to the lower part of the cylindrical member, a second vent tube adjacent to the first-named vent tube, a cover for the last-named vent tube, and thermostatically operated means for actuating the vent tube cover.

2. In a brooder-heater, the combination with a brooder housing 20, of a heater housing 11, disposed adjacent to the brooder housing, a horizontal tubular circulating member 14 extending from the heater housing and within the brooder housing, a lamp 12 disposed within the heater housing, a flue 21 extending vertically from the lamp and within the horizontal cylindrical circulating member and having its upper end adjacent to the top of the horizontal cylindrical member, a smoke vent tube 23 extending vertically from the horizontal cylindrical member and having its bottom end adjacent to the bottom of the horizontal cylindrical member, said horizontal cylindrical member extending within the brooder housing, a draft-regulating vent tube 30 extending from the tubular member at the top portion thereof and adjacent to the smoke vent tube, a cover for the draft vent tube, and automatic means for actuating the cover.

3. In a heater for brooders, the combination with a brooder housing, of a heater housing adjacent thereto, a lamp within the heater housing, a tubular circulating member extending from the heater housing and within the brooder housing, a hood enclosing the tubular member, a bracket within the hood and supporting the tubular member, a flue extending vertically from the lamp and within the tubular circulating member and having its upper end adjacent to the top portion of the tubular member, a smoke vent tube extending from the tubular member and having its bottom end adjacent to the bottom portion of the tubular member and spaced apart therefrom, a draft vent tube extending from the tubular member and adjacent to the flue and smoke vent tube, and automatically operated means for controlling the draft vent tube.

In testimony whereof, I hereunto affix my signature.

MITSUJI TATEOKA.